United States Patent
Reiter

[15] 3,647,381

[45] Mar. 7, 1972

[54] DENTAL-PROPHYLAXIS COMPOSITION

[72] Inventor: Gabriel Reiter, 8204 Ventnor Ave., Margate City, N.J. 08402

[22] Filed: Apr. 8, 1968

[21] Appl. No.: 719,732

[52] U.S. Cl..................................51/308, 424/49, 424/131
[51] Int. Cl............................................A61r 7/16, B24d 3/02
[58] Field of Search...............................424/49–58; 167/93; 51/308

[56]           References Cited

UNITED STATES PATENTS

| 3,330,732 | 7/1967 | Muhler | 424/49 |
| 3,378,445 | 4/1968 | Muhler | 424/49 |
| 3,450,813 | 6/1969 | Muhler | 424/49 |

*Primary Examiner*—Richard L. Huff
*Attorney*—Robert K. Youtie

[57]           ABSTRACT

This invention is concerned with a dental-prophylaxis composition including particulate zirconium silicate having unique distribution of particle sizes.

8 Claims, No Drawings

DENTAL-PROPHYLAXIS COMPOSITION

BACKGROUND OF THE INVENTION

While the use of zirconium silicate as an abrasive has long been well known in the art, for example in the polishing of glass and the like, the particle sizes there employed were too large for safe dental use. Thus, while the cleaning-and-polishing action of zirconium silicate on natural-tooth surfaces was long appreciated, the particular size distribution of particles required for maximum cleaning and polishing with no resultant damage to the teeth remained unknown.

SUMMARY

Accordingly, it is an important object of the present invention to provide a dental-prophylaxis composition which achieves maximum cleaning-and-polishing effect on natural-tooth surfaces with no resultant damage to the teeth.

It is a further object of the present invention to provide a composition of particulate zirconium silicate having a particle-size distribution and capable of use either as a powder or paste, which achieves maximum tooth cleaning and polishing without tooth damage.

Other objects of the present invention will become apparent upon reading of the following specification and disclosure.

The invention accordingly consists in the combinations of elements which will be exemplified in the following description, and of which the scope will be indicated by the appended claims.

DESCRIPTION OF THE PREFERRED EMBODIMENT

The hardness of zirconium silicate (being 7.5 on the Mohs scale) and its conchoidal cleavage pattern are admirably well suited for abrasive usage, and are believed responsible for the brightness and high-polishing action afforded a tooth surface.

It was found that the required relatively small particle sizes having conchoidal cleavage patterns may only be achieved by impact or traumatic milling. The abrasion and resultant cleaning of tooth surface has been found directly proportional to the particle size of zirconium silicate, while the brightening or polishing action appears inversely proportional to the particle size. It has been found by clinical testing and evaluation that continued use of zirconium-silicate particles having a mean diameter of greater than 30 microns is unsafe and results in damage to the tooth material. However, particle sizes of a mean diameter 30 microns and less have been found to achieve the desired cleaning action without tooth damage. A dental-prophylaxis composition having optimum cleaning-and-polishing action without tooth damage, and capable of long repeated usage includes the following particle-size distribution of zirconium-silicate particles:

TABLE I

| Particle Size in microns | Percentage by Weight |
|---|---|
| from 0.2 to 10 | up to 20% |
| from 10 to 20 | from 20% to 40% |
| from 20 to 30 | the balance up to 60% |

As noted, the above composition achieves effective cleaning without tooth damage. The brightness or degree of polishing depends upon the size distribution in the smallest size range. An optimum size distribution in the smallest size range (from 0.2 to 10 microns) is as follows:

TABLE II

| Particle Size in microns | Percentage by Weight |
|---|---|
| 0.2 to 2.5 | 20% |
| 2.5 to 5 | 55% |
| 5 to 10 | 25% |

While particle sizes of zirconium silicate between 5 and 30 microns may be obtained by dry milling, the smaller sizes between 0.2 and 5 microns are advantageously produced by wet milling.

In use as a dental prophylaxis, the composition described above may be mixed with a small amount of water as a wetting agent, and the advantageous cleaning and polishing results. However, for convenience of the user it is preferred that the above-described composition be provided in a paste form. An admirably well-suited dental-prophylaxis paste includes the following ingredients and percentage weights:

| | |
|---|---|
| zirconium-silicate powder per Tables I and II | 57.25% |
| glycerol | 28.00% |
| bentonite (140–200 mesh) | 14.25% |
| oil of peppermint (terpeneless D.F.) | 0.50% |

The above proportioned ingredients are thoroughly mixed in any desired sequence and preferably homogenized to achieve a smooth final product. The oil of peppermint adds an attractive flavor, but may be omitted, if desired. In the terpeneless form, the oil of peppermint will not deteriorate and the product has an indefinite shelf life.

While the percentage weights given above of the prophylaxis paste may be preferred, it has been found that the zirconium-silicate powder may be varied from about 50 to 75 percent by weight, the glycerol may be varied from about 24.5 percent to about 42.5 percent by weight, and that the bentonite may be varied from about 12.5 percent to 20.5 percent by weight, all without appreciably detracting from the advantageous results of the composition. The period for mixing of the several ingredients may vary from 5 to 20 minutes.

Thus, while a paste as described above may provide convenience in use and long-lasting shelf life, remaining moist for immediate use as desired, it is understood that the zirconium-silicate powder of Tables I and II may be otherwise employed, as with water or other wetting agents, such as various oils.

Preliminary to the instant invention, clinical studies were performed designed to evaluate the safety factor in the continued use of abrasives over a regular and long-range program. The results showed that apparently safe and harmless abrasives used in oral prophylaxis for short-duration studies of up to four years, with prophylaxis being performed at regular 3-month intervals, gave definite proof of tooth-surface abrasion and enamel loss beyond repair from the fifth year on. One such clinical-study program is represented in Table III below.

TABLE III

| | | | | | | | | | | | | |
|---|---|---|---|---|---|---|---|---|---|---|---|---|
| Particle size in microns | 100 | 90 | 80 | 70 | 60 | 50 | 40 | 35 | 32 | 30 | 25 | (1) |
| Number of patients completing | 120 | 85 | 86 | 104 | 40 | 42 | 53 | 111 | 87 | 96 | 41 | 120 |
| Years in clinical study | 1.5 | 1.5 | 2.5 | 4.5 | 5 | 5 | 5.5 | 5.5 | 7 | 9.5 | 9.5 | 5 |
| Number of quarterly prophylaxis treatments | 6 | 6 | 10 | 18 | 20 | 20 | 22 | 22 | 28 | 38 | 38 | 20 |
| Abrasion areas free of caries before study | 98 | 72 | 61 | 63 | 56 | 50 | 42 | 123 | 94 | 41 | 32 | 108 |
| Abrasion areas free of caries after study | 236 | 155 | 124 | 111 | 103 | 121 | 138 | 204 | 101 | 43 | 32 | 110 |
| Abrasion areas developed into caries during study | 185 | 138 | 104 | 163 | 105 | 108 | 114 | 201 | 22 | 0 | 0 | 0 |

[1] Per Tables I and II.

The patients were chosen from between ages 16 through 40, both male and female, and having 26 or more natural teeth and appearing to have a good regimen of home oral hygiene.

From Table III, it will be apparent that long term use of particulate zirconium silicate as a dental prophylaxis is proved safe in a particulate size of 30 microns and less. While the study was attempted on slightly under 1,000 patients, the above data pertains 865 patients remaining in the study to its conclusion. The length of time that the 865 patients remained on the study panel depended entirely on the results of each examination just prior to a periodic prophylaxis treatment. If the results of the examination showed destruction of the teeth beyond normal limits of prophylactic treatment, the test product was withheld from the patient.

From the foregoing, it will now be appreciated that the composition of the instant invention provides a dental prophylaxis which achieves maximum cleaning and polishing, removing dental plaque, food particles, exogenous stains and various surface pigmentations. It also polishes the tooth surface better than any product known, and the polished surface remains brighter and cleaner for a longer period of time. In conjunction with a proper home oral-hygiene regimen, the prophylaxis composition of the present invention effectively reduces carries and is apparently useful over an extremely long period of time.

Although the present invention has been described in some detail by way of illustration and example for purposes of clarity of understanding, it is understood that certain changes and modifications may be made within the spirit of the invention and scope of the appended claims.

What is claimed is:

1. A dental-prophylaxis composition comprising a mixture of zirconium silicate particles including a first quantity of particles up to about 20 percent by weight of between 0.2 and about 10 microns in size; a second quantity of particles of from about 20 percent to about 40 percent by weight of from about 10 microns to about 20 in size; and a third quantity of particles up to about 60 percent by weight of from about 20 microns to about 30 microns in size, there being substantially no particles smaller than 0.2 microns and no particles larger than 30 microns.

2. A dental-prophylaxis composition according to claim 1, said first quantity having the following particle-size distribution:

up to about 20 percent by weight of up to about 2.5 microns in size;

up to about 55 percent by weight of from about 2.5 microns to about 5 microns in size; and up to about 25 percent by weight of from about 5 microns to about 10 microns in size.

3. A dental-prophylaxis composition according to claim 1, said first quantity comprising up to about 55 percent by weight of from about 2.5 microns to about 5 microns in size.

4. A dental-prophylaxis composition according to claim 1, said first quantity comprising up to about 25 percent by weight of from about 0.2 microns to about 2.5 microns in size.

5. A dental-prophylaxis composition according to claim 1, said first quantity comprising up to about 25 percent by weight of from about 5 microns to about 10 microns in size.

6. A dental-prophylaxis composition according to claim 1, in combination with glycerol and bentonite admixed with said zirconium silicate, wherein the zirconium silicate is from about 50 percent to about 75 percent by weight of the admixture.

7. A dental-prophylaxis composition according to claim 6, said glycerol being from about 24.5 percent to about 42.5 percent by weight of the admixture.

8. A dental-prophylaxis composition according to claim 7, said bentonite being in powder form of between about 140 and 200 mesh and from about 12.5 percent to about 20.5 percent by weight of the admixture.

* * * * *